(12) United States Patent
Dehaas et al.

(10) Patent No.: US 10,345,801 B2
(45) Date of Patent: Jul. 9, 2019

(54) ENSURING A CORRECT PROGRAM SEQUENCE IN A DUAL-PROCESSOR ARCHITECTURE

(71) Applicant: HONEYWELL INTERNATIONAL INC., Morris Plains, NJ (US)

(72) Inventors: Drew Christian Dehaas, Etna, NY (US); Aad Van Wensen, Noord-Brabant (NL); Anton Beerens, Noord-Brabant (NL); Jonathan Farmer, Lansdale, PA (US); Alan Foose, King of Prussia, PA (US)

(*) Notice: Subject to any disclaimer, the term of this patent is extended or adjusted under 35 U.S.C. 154(b) by 138 days.

(21) Appl. No.: 15/682,244

(22) Filed: Aug. 21, 2017

(65) Prior Publication Data
US 2019/0056723 A1 Feb. 21, 2019

(51) Int. Cl.
G06F 11/00 (2006.01)
G05B 23/02 (2006.01)
(Continued)

(52) U.S. Cl.
CPC ...... *G05B 23/0291* (2013.01); *G06F 11/0796* (2013.01); *G06F 11/1004* (2013.01);
(Continued)

(58) Field of Classification Search
CPC ............ G05B 23/0291; G05B 23/0205; G05B 23/0259; G05B 23/0262; G05B 23/0275; G05B 23/0286; G05B 19/042; G05B 19/0421; G05B 19/0423; G05B 19/0425; G05B 19/0426; G05B 19/0428; G05B 19/058; G06F 13/4068; G06F 9/32; G06F 9/321; G06F 9/324; G06F 9/3557; G06F 11/0796; G06F 11/08; G06F 11/10; G06F 11/1004; G06F 11/1012; G06F 11/102; G06F 11/1024; G06F 11/1032; G06F 11/1048; G06F 11/1608; G06F 11/1629; G06F 11/1633; G06F 11/1637;
(Continued)

(56) References Cited

U.S. PATENT DOCUMENTS 3,745,316 A * 7/1973 Olah ................... G06F 11/1008
714/47.1
7,168,065 B1 * 1/2007 Naccache ............... G06F 11/28
712/229
(Continued)

*Primary Examiner* — Anthony J Amoroso

(57) ABSTRACT

A method of ensuring a correct program sequence in a dual-Processor module that includes Processor A and Processor B. Processor A and Processor B are both coupled to a common memory. Processor A and Processor B each execute a first safety program and each generate an instruction stream therefrom. At one or more points in time while running the first safety program, Processor A reads its program counter value from a current instruction being executed and generates therefrom a current Processor A CRC value, and Processor B reading its program counter value from the same current instruction being executed generates therefrom a current Processor B CRC value. Processor A transfers its current CRC value to Processor B and/or Processor B transfers its current CRC value to Processor A, and these CRC values are compared. A safety action is triggered if the comparing determines non-matching current CRC values.

16 Claims, 2 Drawing Sheets

(51) Int. Cl.
  *G06F 13/40* (2006.01)
  *G06F 11/28* (2006.01)
  *G06F 11/16* (2006.01)
  *G06F 11/07* (2006.01)
  *G06F 11/10* (2006.01)

(52) U.S. Cl.
  CPC ...... *G06F 11/1629* (2013.01); *G06F 11/1633* (2013.01); *G06F 11/28* (2013.01); *G06F 13/4068* (2013.01)

(58) Field of Classification Search
  CPC ........ G06F 11/165; G06F 11/28; G06F 21/50; G06F 21/52; G06F 21/54
  See application file for complete search history.

(56) References Cited

U.S. PATENT DOCUMENTS

| | | | | |
|---|---|---|---|---|
| 2002/0144176 | A1* | 10/2002 | Smith | G06F 11/10 714/11 |
| 2004/0143814 | A1* | 7/2004 | de Jong | G06F 9/44589 717/104 |
| 2009/0276609 | A1* | 11/2009 | Moyer | G06F 9/3004 712/220 |
| 2016/0026791 | A1 | 1/2016 | Melski et al. | |

\* cited by examiner

ENSURING A CORRECT PROGRAM SEQUENCE IN A DUAL-PROCESSOR ARCHITECTURE

FIELD

Disclosed embodiments relate to process control systems, more specifically to process controllers or input/output (IO) modules in a process control system having dual-processor architectures.

BACKGROUND

A process controller can comprise a Programmable Logic Controller (PLC) which includes various components that work together to bring information into the PLC from the field devices, evaluate that information, and then send control information via outputs 10 modules back out to various the field devices such as actuators. These basic PLC components comprise a power supply, central processing unit (CPU) or other processor (e.g., microcontroller), co-processor modules and input and output modules (I/O). The CPU evaluates the status of inputs, outputs, and other variables as it executes a stored program. The CPU then sends control signals to update the status of outputs.

The failure of an industrial control system can lead to costly downtime. There is expense involved in restarting an industrial process along with the actual production losses resulting from a failure. If the process is designed to operate without supervisory or service personnel, all of the components in the process control system generally need to be fault-tolerant.

A safety controller may employ a dual-processor architecture where there is a "master" (or primary) and "checker" (or secondary) processor that both execute the same safety function. Periodically the results of executing the safety program are exchanged over a memory device shared between the processors. These results are compared to ensure no single hardware fault has caused one of the processors to deviate in the safety function. There are two levels of fault tolerance, the tolerance described above to ensure safety in a single controller by checking for aberrant hardware behavior, and the tolerance for maintaining a running control system in the presence of a fault.

In a known redundant control system there are separate controllers having separate IO modules that each process field values received from field devices such as sensors including converting the received data signals into logic signals that correspond to measured signals as inputs that the CPU can use. The measured signals do not have to be equal for the respective process controllers due to hardware and timing differences. However when used in an industrial application each controller must use synchronized input values because otherwise the respective controller applications can take a different control path.

In one safety system arrangement, for an increased safety level or extra reliability there is a redundant control system having first and second parallel connected safety controllers each with a dual-processor architecture in each controller, where the two processors in each controller that share a common memory and simultaneously execute the same safety program. Every caller/callee combination regarding program control transfer between subroutines of a program in the safety program are generally enumerated for checking by the programmer referred to as logical monitoring which compares the program sequence obtained from the respective processors in the dual-processor architecture. The goal of this logical monitoring is to ensure that the safety functions intended to be executed by the program are in fact executed, and executed in the desired order.

This logical monitoring process protects against hardware faults in the processors that can cause process or safety problems that would otherwise cause divergence in execution from the programmer's intention which can remain undetected and thus cause process problems. This monitoring can also detect systematic software faults that exhibit some non-determinism (i.e., can also detect systematic software faults that show a random variation in effects).

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize for known logical monitoring of program sequences for process controllers in dual-processor architectures which share a common memory where the respective processors both run the same safety program that execute independently but are executing the same safety function, every caller/callee combination in the program is generally enumerated by the programmer for checking. This known method is error-prone due to heavy programmer involvement. Other shortcomings of this known method include the amount of work for the programmer can be exponential based on the number of function calls that the particular safety program contains.

Disclosed embodiments overcome these problems by providing methodologies for ensuring a correct program sequence for dual-processor architectures. Cyclic redundancy check (CRC) values are calculated from an executed data block/sequence of an instructing stream to provide a fast and 'lightweight' approach for ensuring equivalent program sequences on the respective processors in a dual-processor arrangement. The two processors only have to each periodically, for selected instructions, calculate a relatively small CRC value (e.g., CRC-32, being 32 bits) from the instruction stream generated which is compared between the processors, rather than a conventional full program sequence-check, which means disclosed methods are considerably faster.

As described above, there are two levels of fault tolerance, the tolerance described above to ensure safety in a single controller by checking for aberrant hardware behavior, and the tolerance maintaining a running control system in the presence of a fault. Disclosed techniques can be applied to either of these types of processor redundancy.

Disclosed embodiments include methods of ensuring a correct program sequence for a redundant safety controller or redundant IO module that has two processors which share a memory that execute independently but are executing the same safety function which provide more flexibility as compared to traditional logical program sequence monitoring in that every caller/callee combination in the program need not be enumerated by the programmer. As noted above, caller/callee is conventional terminology for program control transfer between subroutines of a computer program.

A subroutine is a mechanism for modularizing program design. A "caller" is a subroutine that has been invoked by a "callee" subroutine (i.e., processor control has been transferred from the "caller" to the "callee"). In a faulty processor, for example, the transfer from "caller" A to "callee" B may never occur, and thus part of the program may be skipped, the transfer from "caller" A to "callee" C can occur instead of the correct transfer to "callee" B, the transfer from "caller" A to "callee" B can occur properly, but when B completes it does not transfer control back to "caller" A as it should. Disclosed sequence monitoring, is meant to detect the above failure modes, and allow the program to respond to such failures.

Disclosed embodiments are thus much less error-prone as programmer involvement is significantly reduced with disclosed methods because the programmer is only responsible for identifying key program functions that require protection (i.e., are deemed critical to the logical sequence in the safety controller) and the dual-processor architecture CRC comparing takes care of the rest of the logical checking.

One disclosed embodiment comprises a method of ensuring a correct program sequence in a dual-processor module that includes processor having program counters for convenience referred to as being processor A and processor B. The program counters of processor A and processor B are both coupled to a common memory. Processor A and Processor B each execute a first safety program and each generate an instruction stream therefrom. At one or more points in time (flexible points in time designated by the programmer) while running the first safety program, processor A reads its program counter value from a current instruction corresponding to the selected point in time being executed and generates therefrom a current processor A CRC value, and processor B reads its program counter value from the same current instruction being executed generates a current processor B CRC value.

A CRC value combines many values (CRC is calculated generally from a polynomial from a data block of arbitrary length, or a data sequence) into a single short, fixed-length binary sequence, such as a 32 bit sequence (CRC-32) also known as the check value, that is statistically highly likely to be unique given that particular sequence. The current processor A CRC value is compared to the current processor B CRC value. A safety action is automatically triggered if the comparing determines that the current processor A CRC value does not match the current processor B CRC value. The safety action is generally provided by the programmer, and can be based on the particular detected fault.

DETAILED DESCRIPTION

Figure 1:
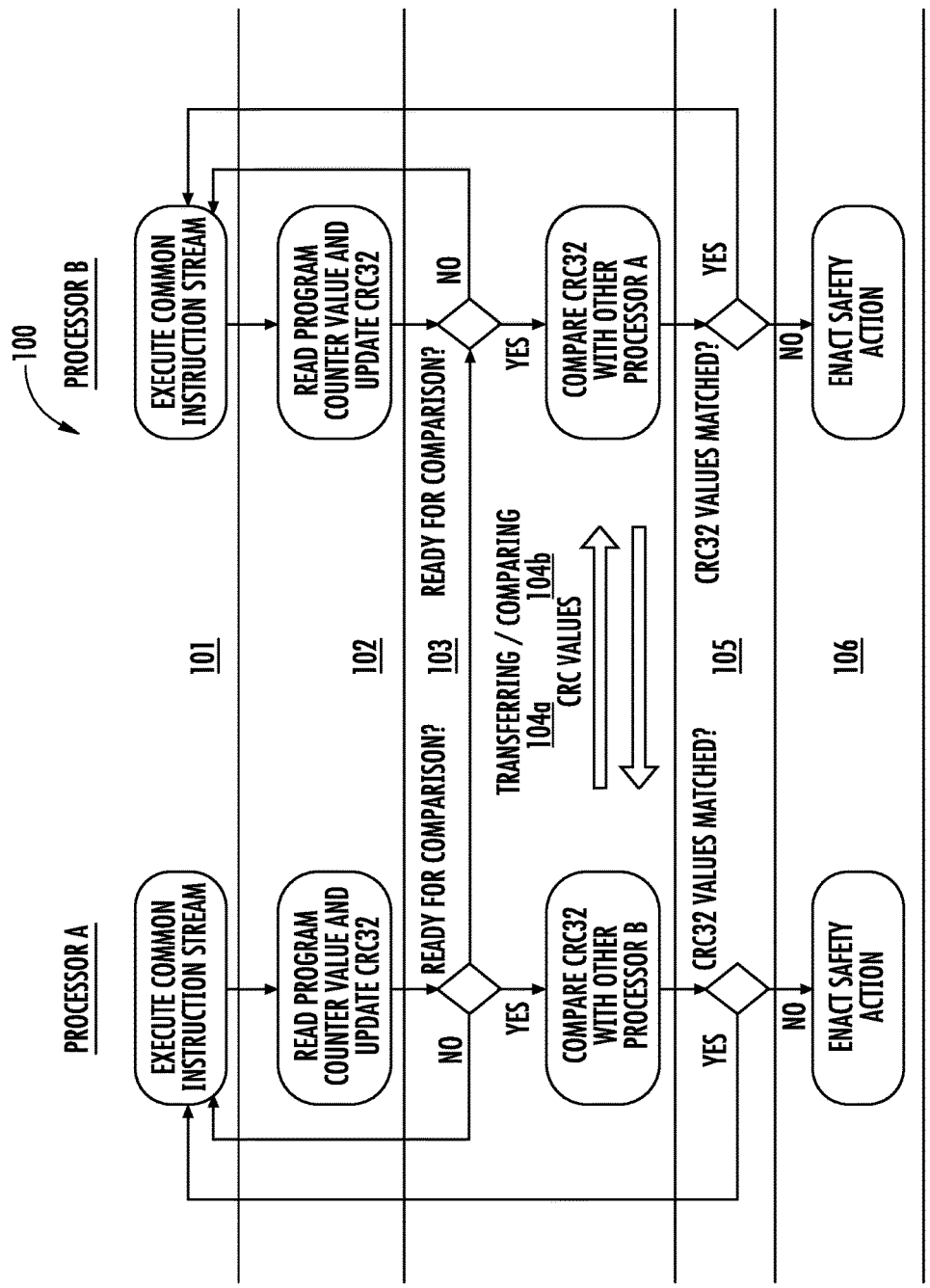
FIG. 1 is a flow diagram showing disclosed method steps for executing the same safety function on two independent processors in a dual-processor architecture that share a common memory within a process controller module and ensuring a correct program sequence, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a flow diagram showing example steps in a method 100 for ensuring a correct program sequence by executing the same safety function on two independent processors (Processor A and processor B used herein) in a dual-processor module architecture that each include program counters which share a common memory, according to an example embodiment. Processor A and processor B execute independently but are executing the same safety function and logical sequence monitoring for dual-processors algorithm. Step 101 comprises processor A and processor B each including a program counter both executing the logical sequence monitoring for dual-processors algorithm and a first safety program including a plurality of processor instructions in a program sequence to generate an instruction stream therefrom.

The first safety program includes a plurality of processor instructions, and the processors each generate an instruction stream that is their computed output generated after executing the safety program. The processors each obtain an identical copy of the safety program which may be stored in a memory generally anywhere that is accessible to the processors, that is not generally in the shared memory. The common shared memory is used to exchange CRC values (see step 103 below) so that each processor can ensure they have the same CRC value as the other processor.

See the fault-tolerant process control system 200 shown in FIG. 2 described below including processor A and processor B that share a common memory provided in CP1 120 (µP 122, 124), CP2 130 (µP 132, 134), as well as input/output (IO) modules shown as first IOM 150 (µP 151, 153) and second IOM 155 (µP 156, 158) that all share a common memory. Each pair of processors in CP1 120, CP2 130, first IOM 150 and second IOM 155 can implement method 100. As described below, the common memory is used for exchanging CRC values.

Step 102 comprises at one or more selected points in time while executing the first safety program processor A and processor B both reading a program counter value from their program counters and updating a CRC value from the instructing stream generated corresponding to the selected point in time and thus the processor instruction being executed, such as calculating the 32 bit CRC shown as in FIG. 1 as CRC32. Each CRC value generated thus represents an unbounded sequence of identifiers for specific logical steps that the program can take. The program counter is read from the processor itself, which tells one precisely what the processor has executed. A program counter as known in the computer arts is a register in a computer processor that contains the address (location) of the instruction being executed at the current time. As each instruction gets fetched, the program counter increases its stored value.

CRC is known to be an error-detecting code commonly used in digital networks and storage devices to detect accidental changes to raw data. Blocks of data entering these systems get a short check value attached that is based on the remainder of a polynomial division of their contents. On retrieval, the calculation is repeated and, in the event the check values do not match, corrective action can be taken against the data corruption.

Regarding CRC values, one can use 32-bit (or 16 bit, or 64 bit). A larger bit width just provides one a better probability of not getting an undetected sequence deviation between the two processors. 32-bits makes it extremely unlikely to not detect an error, while 64-bits makes it essentially impossible to not detect an error.

The selected points in time while executing the program for calculating CRC values are quite flexible. The selected points in time can be can be at each synchronization point defined in the program every place where the processors ensure they are executing the same software instructions. The selected times can also be within a particular function, surrounding only a subset of functions, or around every function in the safety processor code. The selected points in time can be for every single processor instruction executed, which would be the slowest approach, but which provides the highest degree of confidence that the processors have executed everything identically.

There can also only be 2 selected points in time in the entire safety program, to just ensure that the two most important items in the safety program are always executed the same on both processors. 2 selected points would be extremely fast (only two CRC updates needed), but does not give one as strong of a guarantee about both processors executing the exact same program. The selected points in time can be key times for comparing defined by the user based on the desired functionality of the controller. For example, in a safety system key times may be driven by the "process safety time" that the user has defined for their plant/control system. In a control system the "key times" can be at the end of each process controller control loop cycle. When as disclosed herein program counter values are read and used as a unique identifier for an operation performed by a processor, and the generated instruction stream for the operation is used for updating the CRC value, one obtains a very strong assurance that they are comparing between the two processors what they have actually executed, not just what has been programmed to be executed.

Step 103 comprises processor A and processor B each determining whether they have reached the CRC comparison step, which is defined by the common program they are both executing. If it is determined it is not ready to compare CRC values, the method returns to step 101, and if it is determined the CRC values are ready to be compared, the method advances to step 104*a*.

Step 104*a* comprises at least one of processor A transferring its CRC value to processor B and processor B transferring its CRC value to processor A. The common memory is used for exchanging of CRC values. Step 104*b* comprises at least one of processor A and processor B comparing their CRC values to those received from the other processor. Redundancy is provided by verifying at key points in the safety program that the resulting computed CRCs are identical between the respective processors, where any mismatch in CRC values results in a fault detected by at least one of the processors.

By transferring CRC values in both directions (A to B, and B to A) one obtains twice the checks. For example, if only A was faulty, and only A performed the CRC comparison, one does not know if A is faulty because it incorrectly transferred the CRC value, or if the processors have diverged in execution (which is what one is trying to detect). If both processors A and B perform the CRC comparisons, and both find differences, it is much more likely that they have diverged in execution sequence than it is that one of them is, for example, having problems reading the CRC value from the other processor.

Step 105 comprises determining whether the respective CRC values are matched based on the comparing in step 104*b*. If the CRC values are matched, the method returns to step 101, and if the CRC values are found to not be matched, the method moves to step 106 comprising enacting a safety action generally defined by the user of the system (e.g., process engineer). For example, shutting down parts of the control system, or raising an alarm. The Safety action is generally user-configurable, in our system at least.

Integers are used to represent the selected points in time which correspond to a deemed important program state. These integers can be:
1. Explicitly defined by the programmer, such as integer value 1 is mapped to code location Y, integer value 2 is mapped to code location Z, etc.
2. The current value of the processor program counter. This is a guaranteed unique integer value for each executable instruction in the safety program.
3. The address of the currently executing program function. This also generates a unique value, but can be mostly determined at a compile-time as some value BaseLoadAddress plus FixedFunctionOffset, but can be determined statically (i.e., the possible set of values can then be known ahead of time, before the program executes).

All of these example integer value options are believed to be practical for industrial implementation. The third option can be implemented by reading the program counter register provided on most hardware platforms, such as microprocessors.

Regarding CRC calculation, there are three example ways described below to create CRC values for disclosed CRC comparing:
1. Append to a fixed-size circular buffer of 32-bit integers and ensure that comparisons occur before the buffer wraps around.
2. Same as #1, except there is no guarantee that CRC comparison occurs before buffer wrap.
3. Keep a running CRC32 that is incrementally updated at every instruction location corresponding to the selected point(s) in time.

Options #2 and #3 together generally provide the best combination of debuggability and performance. Keeping a partial circular buffer can be important so one can discover the sequence that led to a fault when there is a CRC comparison mismatch.

It is believed disclosed logical monitoring of program sequences is unique in several regards. These new features include (a) applying CRCs to instruction streams from logical program sequences, (b) comparing such sequential data (encoded as CRCs) in a dual-processor architecture, and (c) automatically deriving program sequence locations from the program counter for calculating CRC values from the resulting instructing stream corresponding to the selected points in time.

Figure 2:
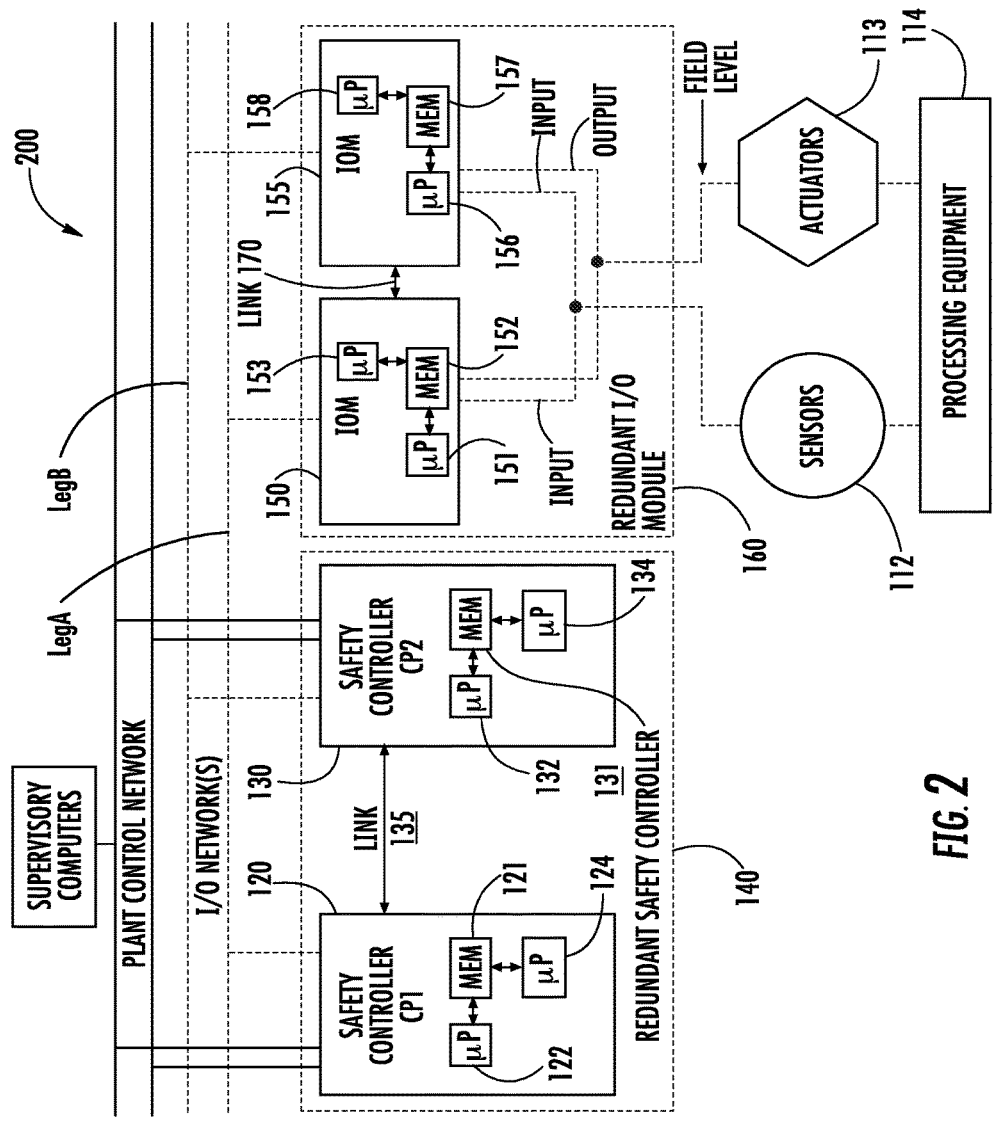
FIG. 2 shows the deployment of disclosed correct program sequence verification for a dual-processor architecture technique in a larger safety system context, according to an example embodiment. Both the safety processors shown as CP1 and CP2 independently use this correct program sequence verification method, as do the downstream 10 modules. Each module (safety processor and IOM module) has two microprocessors that execute independently but are executing the same safety function and use a CRC comparison to ensure that they are always executing the same steps/sequence of the safety function.

FIG. 2 shows an example fault-tolerant industrial control system 200 comprising a redundant process controller 140 shown as a 'redundant safety controller' comprising a first process controller (CP1) 120 including a first processor A 122 and a first processor B 124 that share a common first memory 121, and a second redundant process controller (CP2) 130 including a second processor A 132 and a second processor B 134 that share a common second memory 131. The processors can comprise a microprocessor, digital signal processor (DSP), or a microcontroller unit (MCU). The processors generally each include a program counter.

A redundancy link 135 is for sharing data between the two CPs. The redundancy link 135 does not perform any of calculations. The distributed data over the redundancy link 135 between the CPs includes a plurality of channel configurations comprising a digital output (DO), a digital input (DI), an analog input (AI) and an analog output (AO).

A redundant IO module 160 comprises a first IO module 150 and a second IO module 155 that are between the redundant process controller 140 and the field devices 112, 113 which are coupled to processing equipment 114. The first IO module 150 comprises a first IO processor A 151 and a second IO processor B 153 that share a common first IO memory 152 and the second IO module 155 comprises a second IO processor A 156 and a second IO processor B 158 that share a common second IO memory 157. The link 170 shown between the first IO module 150 and the second IO module 155 is the redundancy link between these redundant IO modules.

A first connection leg (shown as LegA) is shown connecting the CP1 120 to the first IO module 150, and a second connection leg (shown as LegB) is shown connecting CP2 130 to the second IO module 155. In operation CP1 120 receives scan values from the first IO module 150 over LegA and CP2 130 receives the scan values from the second IO module 155 over LegB. As described above, CP1 120, CP2 130, first IOM 150 and second IOM 155 can all execute method 100.

Technical benefits of disclosed ensuring a correct program sequence for a redundant safety controller or IO module that has two processors in a dual-processor arrangements which share a common memory which execute independently but are executing the same safety function include more flexibility as compared to than traditional logical program sequence monitoring in that every caller/callee combination in the program does not need to be enumerated by the programmer. Disclosed embodiments are much less error-prone (on the programmer's part) because of this feature. The programmer is only responsible for identifying key functions that require protection (i.e., are critical to the logical sequence in the safety controller) and the dual-processor architecture takes care of the rest.

Disclosed embodiments can be applied to generally a variety of safety systems. For example, as described above, there are two levels of fault tolerance. The fault-tolerance that ensures safety in a single controller or IO module with dual-processors by checking for aberrant hardware behavior. One example comprises detecting faults in a single controller or IO module (with two processors) to ensure a high level of safety for that module. This involves detecting a difference between processors which means detecting something is faulty and thus the system should safely shutdown or enact whatever behavior is deemed "safe" by the user. The fault-tolerance regarding maintaining a running system in the presence of a fault. This involves detecting differences between two separate controller or IO modules to provide higher uptime; i.e., detecting a failure in one such module, so that the customer can continue running with the non-faulty module and replace the faulty one.

EXAMPLES

Disclosed embodiments are further illustrated by the following specific Examples, which should not be construed as limiting the scope or content of this Disclosure in any way.

Table 1 below shows an Example program; outer function (caller):

TABLE 1

| Instruction Address | Instruction content (pseudo code) |
|---|---|
| 0 | InputValue ← Read from external device |
| 1 | CRC ← UpdateCrc(CRC, ProgramCounter) |
| 2 | if (InputValue > UpperLimit) → Raise alarm |
| 3 | if (InputValue < LowerLimit) → Raise alarm |
| 4 | OutputValue ← ComputeResult(InputValue) |
| 5 | WriteValueToExternalDevice(OutputValue) |
| 6 | Compare the CRCs |
| 7 | GOTO instruction 0 |

Table 2 below shows an Example program; inner function (callee): "WriteValueToExternalDevice( )"

TABLE 2

| Instruction Address | Instruction content (pseudo code) |
|---|---|
| 8 | CRC ← UpdateCrc(CRC, ProgramCounter) |
| 9 | Wait until the device is ready |
| 10 | OutputValue → Write to external device |
| 11 | CRC ← UpdateCrc(CRC, ProgramCounter) |
| 12 | return to caller |

In the above shown example there are two subroutines, a caller (Table 1) and callee (Table 2). The caller is a simple loop that reads an input from a device and then writes a value (computed based on that input) to the output device. There are three selected places (points in time) that each processor updates its CRC: instructions 1, 8, and 11. When the processor is executing an instruction, its program counter will have that instruction address as the value. At the end of each loop (instruction 7) the processors exchange and compare CRC values. If both processors executed properly, they should both have computed CRC(1, 8, 11). If one of them, for example, did not execute the entire WriteValueToExternalDevice( ) subroutine due to a fault, the CRCs compared will be CRC(1) !=CRC(1, 8, 11) and the fault will be detected. In the very unlikely event both processors fault in the same way and skip that same subroutine, the comparison will be CRC(1)=CRC(1), and this particular fault will go undetected.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. For example, disclosed methodologies can be applied to processor controllers in general (beyond safety systems) where one wants to ensure the exact same behavior between any two processors or modules in a control system. Moreover, as an alternative to the program counter, a computer programmer supplied enumeration of each to-be-checked processor instructions can be used. In this case the CRC is updated with a fixed value provided by the programmer so that no processor state is read to obtain the updated CRC value. In addition, while a particular feature may have been disclosed with respect to only one of several implementations, such feature may be combined with one or more other features of the other implementations as may be desired and advantageous for any given or particular application.

The invention claimed is:

1. A method of ensuring correct program sequences in a dual-processor module that includes Processor A and Processor B both coupled to a common memory, comprising:
    said Processor A and Processor B each including a program counter and executing a first safety program including a plurality of processor instructions in a program sequence to generate an instruction stream therefrom;
    at one or more selected points in time while said executing said first safety program, said Processor A reading a program counter value from its said program counter from a current instruction being executed and then calculating a current Processor A cyclic redundancy check (CRC) value from said program counter value corresponding to said instruction stream at said selected point in time in said program sequence, and said Processor B reading a program counter value from its program counter from said current instruction being executed and then calculating a current Processor B CRC value from said program counter value corresponding to said instruction stream at said selected point in time in said program sequence;
    at least one of said Processor A transferring its current CRC value to Processor B and said Processor B transferring its current CRC value to said Processor A;
    comparing said current Processor A CRC value to said current Processor B CRC value, and
    triggering a safety action if said comparing determines that said current Processor A CRC value does not match said current Processor B CRC value.

2. The method of claim 1, wherein said comparing comprises both said Processor A and said Processor B comparing said current Processor A CRC value to said current Processor B CRC value.

3. The method of claim 1, wherein said selected points in said program sequence are automatically selected from said program counter values.

4. The method of claim 1, wherein said selected points in time total less than said plurality of processor instructions.

5. The method of claim 1, wherein said dual-processor module comprises a first and a second safety controller configured together as a redundant safety controller.

6. The method of claim 1, wherein said dual-processor module comprises a redundant first and second input/output (I/O) module configured together as a redundant I/O module.

7. The method of claim 1, wherein said Processor A and said Processor B both comprise microprocessors.

8. The method of claim 1, wherein a plurality of said dual-processor modules within a fault-tolerant industrial control system comprises:
    a first said dual-processor module as a first safety controller and a second dual-processor module as a second safety controller configured together in a redundant safety controller, and
    a third said dual-processor module as a first input/output (I/O) module and fourth said dual-processor module as a second input/output (I/O) module configured together in a redundant I/O module,
    wherein said first and second I/O modules are both coupled to field devices that are coupled to processing equipment.

9. A dual-processor module, comprising:
    a Processor A and a Processor B both coupled to a common memory;
    said Processor A and said Processor B each including a program counter for executing a logical sequence monitoring for dual-processors algorithm and a first safety program including a plurality of processor instructions in a program sequence to generate an instruction stream therefrom; said logical sequence monitoring algorithm implementing a method of ensuring a correct program sequence, comprising;
    at one or more selected points in time while said executing said first safety program, said Processor A reading a program counter value from its said program counter from a current instruction being executed and then calculating a current Processor A cyclic redundancy check (CRC) value from said program counter value corresponding to said instruction stream at said selected point in time in said program sequence, and said Processor B reading a program counter value from its program counter from said current instruction being executed and then calculating a current Processor B CRC value from said program counter value corresponding to said instruction stream at said selected point in time in said program sequence;
    at least one of said Processor A transferring its current CRC value to Processor B and said Processor B transferring its current CRC value to said Processor A;
    comparing said current Processor A CRC value to said current Processor B CRC value, and
    triggering a safety action if said comparing determines that said current Processor A CRC value does not match said current Processor B CRC value.

10. The dual-processor module of claim 9, wherein said dual-processor module comprises a first and a second safety controller configured together as a redundant safety controller.

11. The dual-processor module of claim 9, wherein said dual-processor module comprises a redundant first and second input/output (I/O) module configured together as a redundant I/O module.

12. The dual-processor module of claim 9, wherein said comparing comprises both said Processor A and said Processor B comparing said current Processor A CRC value to said current Processor B CRC value.

13. The dual-processor module of claim 9, wherein said selected points in said program sequence are automatically selected from said program counter values.

14. The dual-processor module of claim 9, wherein said selected points in time total less than said plurality of processor instructions.

15. The dual-processor module of claim 9, wherein a plurality of said dual-processor modules within a fault-tolerant industrial control system comprises:
- a first said dual-processor module as a first safety controller and a second dual-processor module as a second safety controller configured together in a redundant safety controller, and
- a third said dual-processor module as a first input/output (I/O) module and a fourth said dual-processor module as a second input/output (I/O) module configured together in a redundant I/O module,
- wherein said first and second I/O modules are both coupled to field devices that are coupled to processing equipment.

16. The dual-processor module of claim 9, wherein said Processor A and said Processor B both comprise microprocessors.

* * * * *